June 10, 1930.   H. L. KNEEN   1,762,994
TIRE SUPPORT
Filed Sept. 1, 1927   2 Sheets-Sheet 1
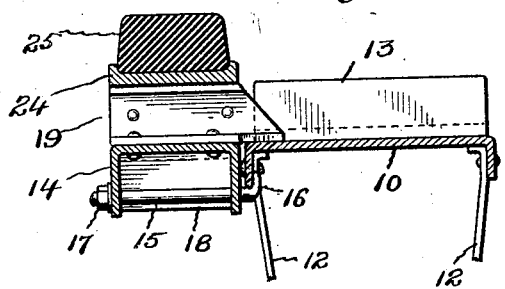
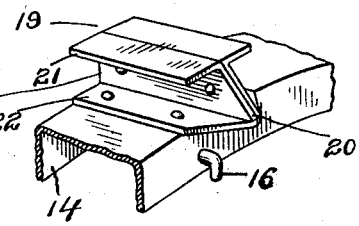
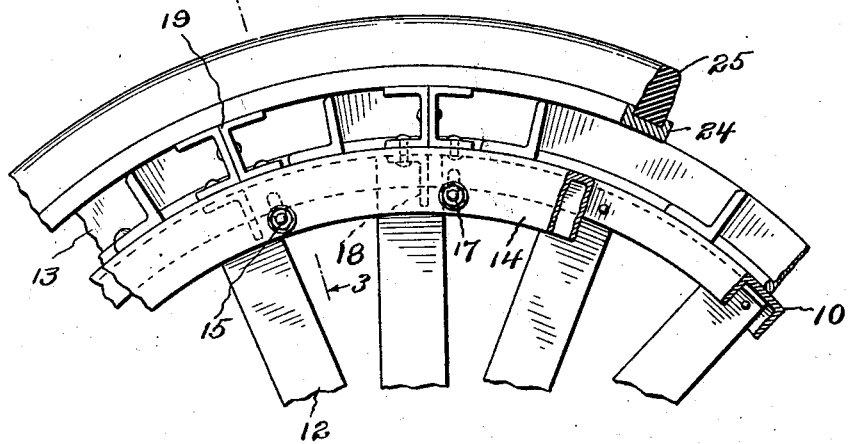
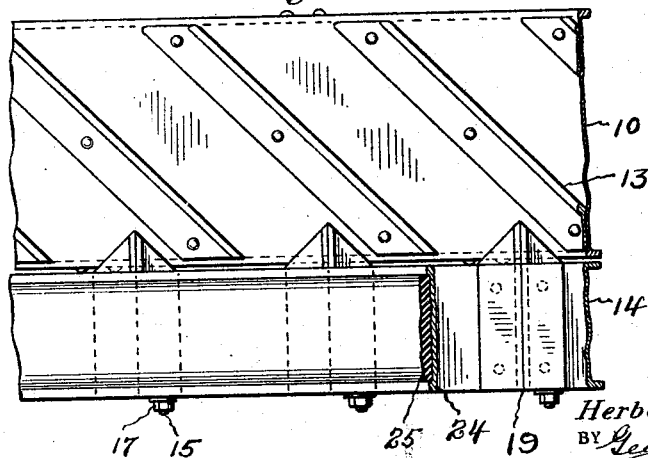
INVENTOR
Herbert L. Kneen
BY
ATTORNEY June 10, 1930.  H. L. KNEEN  1,762,994
TIRE SUPPORT
Filed Sept. 1, 1927  2 Sheets-Sheet 2

INVENTOR
Herbert L. Kneen
BY
ATTORNEY

Patented June 10, 1930

1,762,994

UNITED STATES PATENT OFFICE

HERBERT L. KNEEN, OF HAMDEN, CONNECTICUT

TIRE SUPPORT

Application filed September 1, 1927. Serial No. 216,867.

This invention relates to a tire support for a rubber tire associated with a tractor wheel or the like.

It is the object of my invention, among other things, to provide mechanism of this character that may be economically constructed and readily assembled with a tractor wheel and separated therefrom with the minimum labor and skill.

The details and arrangement of the parts of my improved mechanism will be apparent from an inspection of the accompanying drawings in connection with the description hereinafter contained and wherein a preferred embodiment of the invention is disclosed for the purpose of imparting an understanding thereof.

In the drawings, wherein like numerals of reference indicate like parts in the several figures;

Figure 1 is a side elevation of a portion of a tractor wheel and my improved tire support associated therewith;

Figure 2 is a plan view of the parts shown in Figure 1;

Figure 3 is a cross sectional view thereof, taken generally upon line 3—3 of Figure 1;

Figure 4 is a perspective view of a portion of the extension rim, one of the standards and adjacent parts;

Figure 5:
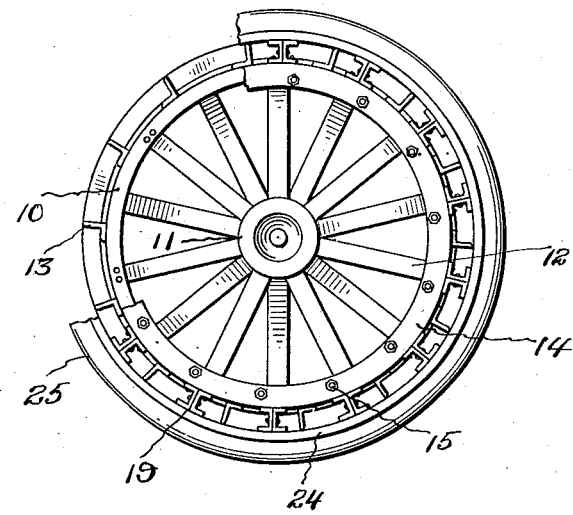
Figure 5 is a side elevation of a tractor wheel having my improved tire support connected therewith.

In the tractor wheel shown herein, which is of a conventional form, 10 designates the rim, 13 the cleats on the outer face thereof, 11 the hub, and 12 the spokes therebetween.

My improved tire support is designed to be attached to one face of the rim and in extension laterally thereof. The extension rim 14 is substantially U-shape in cross section, with a plurality of tie bolts 15 therethrough, each bolt having an offset head 16 which engages the inner face of one of the flanges on the rim 10 and by means of the nuts 17 are separably and rigidly secured thereto. To prevent any possible crushing of the walls of the rim 14 by tightening the nuts 17, and to add strength to the extension rim, there is inserted between such walls a plurality of flanges 18, there being preferably, but not necessarily, a flange adjacent to each of the bolt openings in the rim 14. Fixed to the outer face of the extension rim 14 are a plurality of standards 19, each being composed of two U-shape angle pieces 20, having substantially parallel top portions 21 and base portions 22 that are connected by a wall 23. The angle pieces are secured together and each of the standards is secured to the extension rim 14 by rivets, brazing or the like. The inner pointed end of each of the standards projects over the outer face of the rim 10, which facilitates the assembly of the tire support with the tractor wheel. A tire rim 24, carrying a rubber tire 25, is secured to the top portions 21 of the standards, by rivets, brazing or the like. The relative size of the parts is such that the tread of the tire 25 is of greater diameter than the outside diameter of the cleats 13, thus, when my device is attached to the tractor wheel, all of the weight will be taken by the rubber tire.

In assembling, the extension rim 14 is placed against the rim 10, substantially as shown in Figure 3, with the pointed portions of the standards 19 projecting thereover between the cleats 13. The bolts 15 are then positioned and all of the parts are secured together as a unit.

Figure 6:
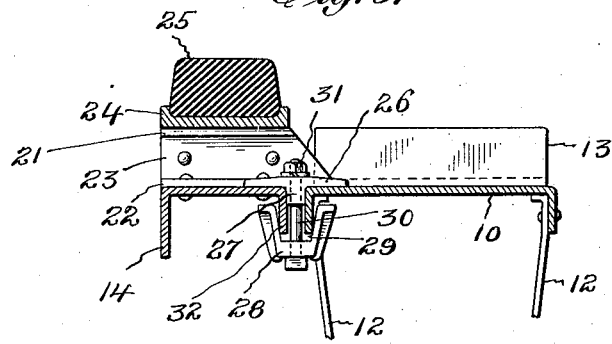
Figure 6 is a view similar to Figure 3, showing a second form of securing means.

In Figure 6 I have shown another method of securing the extension rim 14 to the tractor wheel. This consists essentially in the use of a well known rim clamp having a cap member 26, which projects laterally over the rims 10 and 14, with a lug 27 thereon that lies between the adjacent faces of said rims; a body member 28, having an open throat 29, into which projects the inner portions of each of the adjacent flanges of the rims 10 and 14, and through both of these parts and the open space between the flanges is a bolt 30, having a nut 31 thereon. As the inner faces of the throat 29 are inclined slightly the rim flanges are drawn together as the nut 31 is tightened. With a series of these clamps placed around the periphery of the rims the latter will be securely and rigidly held together. I find it convenient in the use of this clamp to make the inner flange 32 of the extension rim 14 of slightly less height than the outer flange, in such places as it is designed to use the rim clamp, shown in Figure 6, although this is not entirely essential.

Within the scope of the appended claims, changes and alternations may be made within my invention, aside from those herein suggested, and I would therefore have it understood that I do not limit myself to the exact construction herein shown and described.

What I claim, is:—

1. An extension rim for a tractor wheel or the like, substantially U-shape in cross section having one or more flanges between the parallel walls thereof which are apertured to receive fastening members, a plurality of standards secured to the rim thereof and projecting radially therefrom with portions adjacent to the rim projecting laterally beyond one face of the rim, and a tire rim encircling said standards and fixed thereto.

2. An extension rim for a tractor wheel or the like apertured to receive fastening members, a plurality of standards secured to the rim thereof and projecting radially therefrom with portions adjacent to the rim projecting laterally beyond one face of the rim, and a tire rim encircling said standards and fixed thereto.

3. An extension rim for a tractor wheel or the like, substantially U-shape in cross section having flanges between the parallel walls thereof which are apertured to receive fastening members, a plurality of standards secured to the rim thereof and projecting radially therefrom with portions adjacent to the rim projecting laterally beyond one face of the rim, and a tire rim encircling said standards and fixed thereto, the flanges and standards having common fastening means.

4. An extension rim for a tractor wheel or the like, having walls apertured to receive fastening members, flanges between the walls which are adjacent to said apertures, a plurality of standards secured to the rim and projecting radially therefrom with portions thereof adjacent to the rim projecting laterally beyond one face of the rim; and a tire rim encircling said standards and fixed thereto, the standards and flanges being equal in number and having common fastening means.

5. An extension rim for a tractor wheel or the like, having walls apertured to receive fastening members, flanges between the walls, a plurality of standards secured to the rim and projecting radially therefrom with portions adjacent to the rim projecting laterally beyond one face of the rim, and a tire rim encircling said standards and fixed thereto, said standards being composed of channel irons having their webs secured together.

6. An extension rim for a tractor wheel or the like, substantially U-shape in cross section, having flanges between the parallel walls thereof which are apertured to receive fastening members, a plurality of standards secured to the rim thereof and projecting radially therefrom, and a tire rim encircling said standards and fixed thereto, said standards being composed of channel irons having their webs secured together, with the bases thereof projecting laterally beyond one face of the rim and pointed relatively thereto.

In testimony whereof, I have hereunto affixed my signature.

HERBERT L. KNEEN.